United States Patent
Molaie Shargh

(10) Patent No.: US 12,486,941 B2
(45) Date of Patent: Dec. 2, 2025

(54) UNIVERSAL MOUNTING PLATE

(71) Applicant: HAMPTON PRODUCTS INTERNATIONAL CORPORATION, Foothill Ranch, CA (US)

(72) Inventor: Hossein Molaie Shargh, Rancho Santa Margarita, CA (US)

(73) Assignee: Hampton Products International Corporation, Foothill Ranch, CA (US)

( * ) Notice: Subject to any disclaimer, the term of this patent is extended or adjusted under 35 U.S.C. 154(b) by 58 days.

(21) Appl. No.: 18/419,465

(22) Filed: Jan. 22, 2024

(65) Prior Publication Data
US 2025/0237345 A1   Jul. 24, 2025

(51) Int. Cl.
*F16M 11/00*   (2006.01)
*F16M 13/02*   (2006.01)

(52) U.S. Cl.
CPC .................................. *F16M 13/02* (2013.01)

(58) Field of Classification Search
CPC ....................................................... F16M 13/02
See application file for complete search history.

(56) References Cited

U.S. PATENT DOCUMENTS

| | | | |
|---|---|---|---|
| 7,698,796 B1 | 4/2010 | Dowling et al. | |
| 11,814,888 B2 * | 11/2023 | Hellwig | E06B 5/167 |
| 2012/0255919 A1 * | 10/2012 | Jones | F16M 13/02 211/26 |
| 2019/0203873 A1 * | 7/2019 | Pei | F16M 11/16 |

* cited by examiner

*Primary Examiner* — Amy J. Sterling
(74) *Attorney, Agent, or Firm* — FisherBroyles, LLP; Glen L Nuttall

(57) ABSTRACT

A mounting plate for a door closer mechanism includes attachment points for attaching the door closer mechanism and openings with opposing parallel linear sides for receiving spacers. The spacers are dimensioned to at least partially fit within the openings, with the spacers defining a through slot to allow passage of shaft of a screw or bolt through the slot and openings. The spacers may include a portion overlapping portions of the mounting plate. The mounting plate may have a stepped profile, with the overlapped portions of the mounting plate having a reduced profile compared to at least some other portions of the mounting plate.

21 Claims, 6 Drawing Sheets

UNIVERSAL MOUNTING PLATE

FIELD OF THE INVENTION

The present invention relates generally to hardware, and more particularly to replacement mounting hardware, for example for door closers.

BACKGROUND OF THE INVENTION

Hardware items are ubiquitous in homes, offices, and other buildings. A variety of suppliers provide numerous items, often performing the same or similar functions, for a variety of uses. When a building is originally equipped, often a single supplier provides hardware items for particular uses, although a variety of suppliers may be used for different items.

Due to use, these items may fail or otherwise lose function over time. Alternatively, an owner or user of the building may desire to replace hardware items to modify functional operation of those items, or to change the aesthetic look of those items.

Unfortunately, similar items from different manufactures may have slightly different footprints, or the similar items may be mounted in a slightly different manner. As an example, a door closer assembly generally has a door closer mechanism affixed to a door by screws. In some cases the door closer mechanism may be directly affixed to the door by the screws, and in some cases the door closer mechanism may be affixed to the door by way of a door closer mounting plate. In the event of replacement of the door closer assembly, it is often desirable to reuse mounting holes of the prior installation for a variety of reasons, including cosmetic reasons as well as for ease of installation and integrity of the door. However, the relative position of the mounting holes may vary from manufacturer to manufacturer, or even between different models of door closers by the same manufacturer. Indeed, mounting hole positions for door closers may be found in a dizzying array of combinations.

BRIEF SUMMARY OF THE INVENTION

Some embodiments provide a mounting plate for a door closer, comprising: a plate including a plurality of attachment points and with at least one opening therethrough; and a plurality of spacers dimensioned to fit against portions of the plate about a set of opposing sides of the at least one rectangular opening, the spacers each having a through slot.

In some embodiments opposing ends of the spacers include cutouts to fit within the opposing sides of the at least one opening. In some embodiments the cutouts fit against the opposing sides of the at least one opening. In some embodiments, a depth of the cutouts is less than a thickness of the plate about the opposing sides of the at least one opening. In some embodiments, the through slot of the spacers has chamfered edges. In some embodiments the plate includes a stepped profile, with different portions of the plate having different thicknesses. In some embodiments portions of the plate including the attachment points have a greater thickness than portions of the plate about the set of opposing sides of the at least one rectangular opening. In some embodiments the attachment points comprise threaded holes. In some embodiments, a thickness of the opposing ends of the spacers is less than or equal to a difference in thickness between the portions of the plate including the attachment points and the portions of the plate about the set of opposing sides of the at least one rectangular opening. In some embodiments, the at least one opening comprises a plurality of openings. In some embodiments the plurality of openings are separated by a reinforcing bar. In some embodiments, the through slot extends between the cutouts at the opposing ends of the spacers. In some embodiments the at least one opening comprises a rectangular opening.

Some embodiments provide a mounting plate for a door closer, comprising: a frame including a plurality of attachment points, the frame defining at least one opening, each at least one opening having at least one section having linear parallel opposing sides; and a plurality of components having opposing walls defining a through slot, at least part of the opposing walls coupled by a coupling at each end, the plurality of components dimensioned such that the coupling at each end fit against portions of the frame about the at least one opening.

In some embodiments, the coupling at each end of the components has a thickness less than a depth of the through slot. In some embodiments, the frame has a first thickness about the plurality of attachment points and a second thickness about the linear parallel opposing sides of the at least one opening, with the first thickness greater than the second thickness. In some embodiments the coupling at each end of the components has a thickness less than or equal to a difference between the first thickness and the second thickness. In some embodiments the depth of the through slot is less than the first thickness.

Some embodiments provide a mounting plate for a door closer, comprising: a rectangular frame having an upper beam, a lower beam, and a first post and a second post coupling opposing ends of the upper beam and lower beam, the upper beam parallel to the lower beam and the first post parallel to the second post, the first post and the second post having a greater thickness than the upper beam and the lower beam, the first post and the second post each having threaded holes; and a plurality of spacers dimensioned to fit against the upper beam and the lower beam, the plurality of spacers each including a through slot, the through slot having a depth less than or equal to the thickness of the first post and the second post. In some embodiments the portion of the coupling that fits against portions of the frame comprises a portion that fits against a face of the portions of the frame about the at least one opening, with the portion of the coupling that fits against the face of the portions of the frame having a thickness less than or equal to a difference between the first thickness and the second thickness, such that the portion of the coupling does not extend beyond a plane defined by the plurality of attachment points with the portion of the coupling fitted against the face of the portions of the frame about the at least one opening.

In some embodiments, the spacers each include opposing walls defining a length of the through slot, with cutouts at opposing ends of the opposing walls, the cutouts being positioned such that portions of the opposing walls fit between the upper beam and the lower beam. Some embodiments further comprise at least one reinforcing bar extending between the upper beam and the lower beam. In some embodiments, the through slot has chamfered edges on a side of the through slot opposite the cutouts.

These and other aspects of the invention are more fully comprehended upon review of this disclosure.

DETAILED DESCRIPTION

Figure 1:
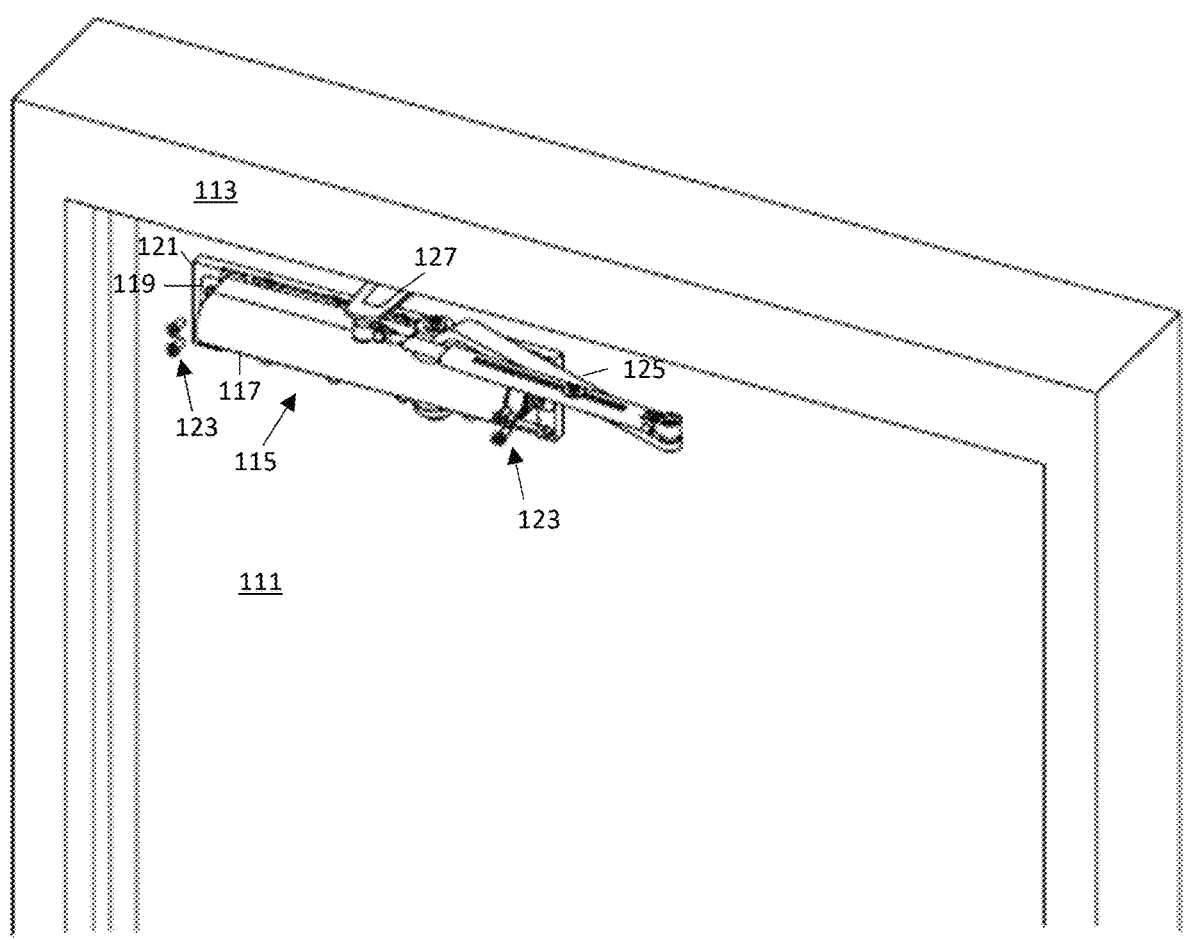
FIG. 1 illustrates a door closer attached to a door, in accordance with aspects of the invention.

FIG. 1 illustrates a door closer assembly attached to a door. The door 111 is shown in a closed position, with the door within a door frame 113. The door closer assembly may be a replacement door closer assembly, in that the assembly may be a replacement for a prior door closer assembly previously mounted to the door. The door closer assembly 115 includes a door closer mechanism 117 on the door, a dual arm 125 extending from a top of the door closer mechanism, with another end of the dual arm coupled to a bracket 127 extending from the door frame.

The door closer mechanism is mounted to a mounting plate 119. The mounting plate is in turn mounted to the door. The door closer mechanism is mounted to the mounting plate at attachment points. In the embodiment of FIG. 1, the attachment points are in the form of threaded holes, e.g., threaded hole 119. The door closer mechanism is mounted to the mounting plate using screws or bolts 123, which may be inserted into the threaded holes.

Figure 2:
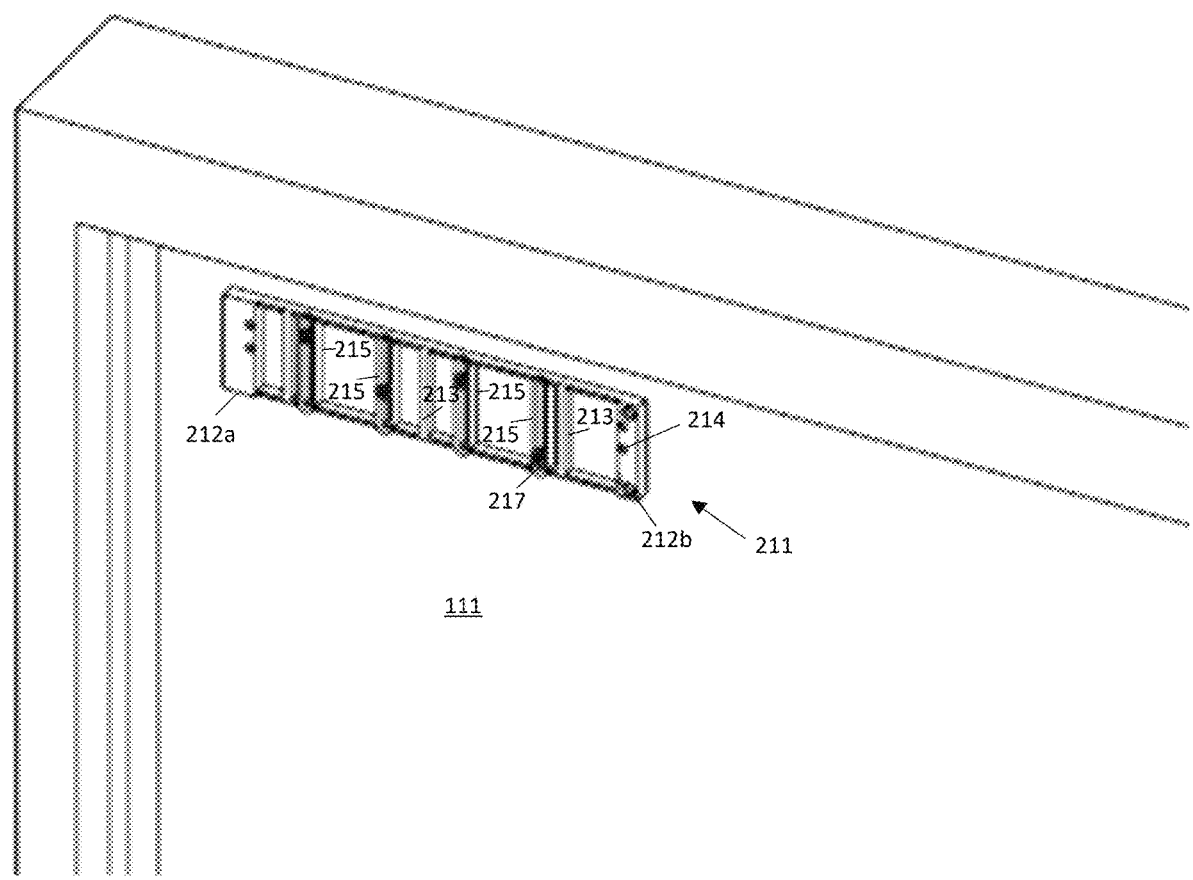
FIG. 2 illustrates a mounting plate with adjustable spacers attached to a door, in accordance with aspects of the invention.

FIG. 2 illustrates an embodiment of the mounting plate, with the mounting plate attached to the door. The mounting plate 211 is substantially planar and in rectangular shape. The mounting plate includes a frame, with openings across a width of the mounting plate. In FIG. 2 the openings are generally rectangular. In various embodiments the openings may be of other shapes. The frame may be considered to include a top beam, a bottom beam parallel to the top beam, and left and right side posts 212a,b connecting ends of the top and bottom beams. The frame, in the embodiment of FIG. 2, also includes plurality of support bars 213 extending from the top beam of the frame to the bottom beam of the frame. The side posts include attachment points for attachment of a door closer mechanism. In the embodiment of FIG. 2, the attachment points are threaded holes, e.g., threaded hole 214. Mounted in the openings of the frame, from the top beam to the bottom beam, are spacers 215. The spacers are dimensioned to fit against portions of the frame. In the embodiment of FIG. 2, the spacers include a portion overlapping the top and bottom beams, so as to fit against the top and bottom beams. The spacers also include a substantially linear through slot to accept shafts of bolts, screws, and the like. Preferably, the slot is dimensioned to allow passage of a shaft of an appropriate bolt or screw, but not a head of the bolt or screw. In operation, the spacers may be placed as desired within the rectangular openings, with tops and bottoms of the spacers abutting against the top and bottom beams, respectively. The mounting plate may then be mounted to the door, as shown in FIG. 2, by passing a shaft of a bolt or screw through the slot and into the door.

Figure 3:
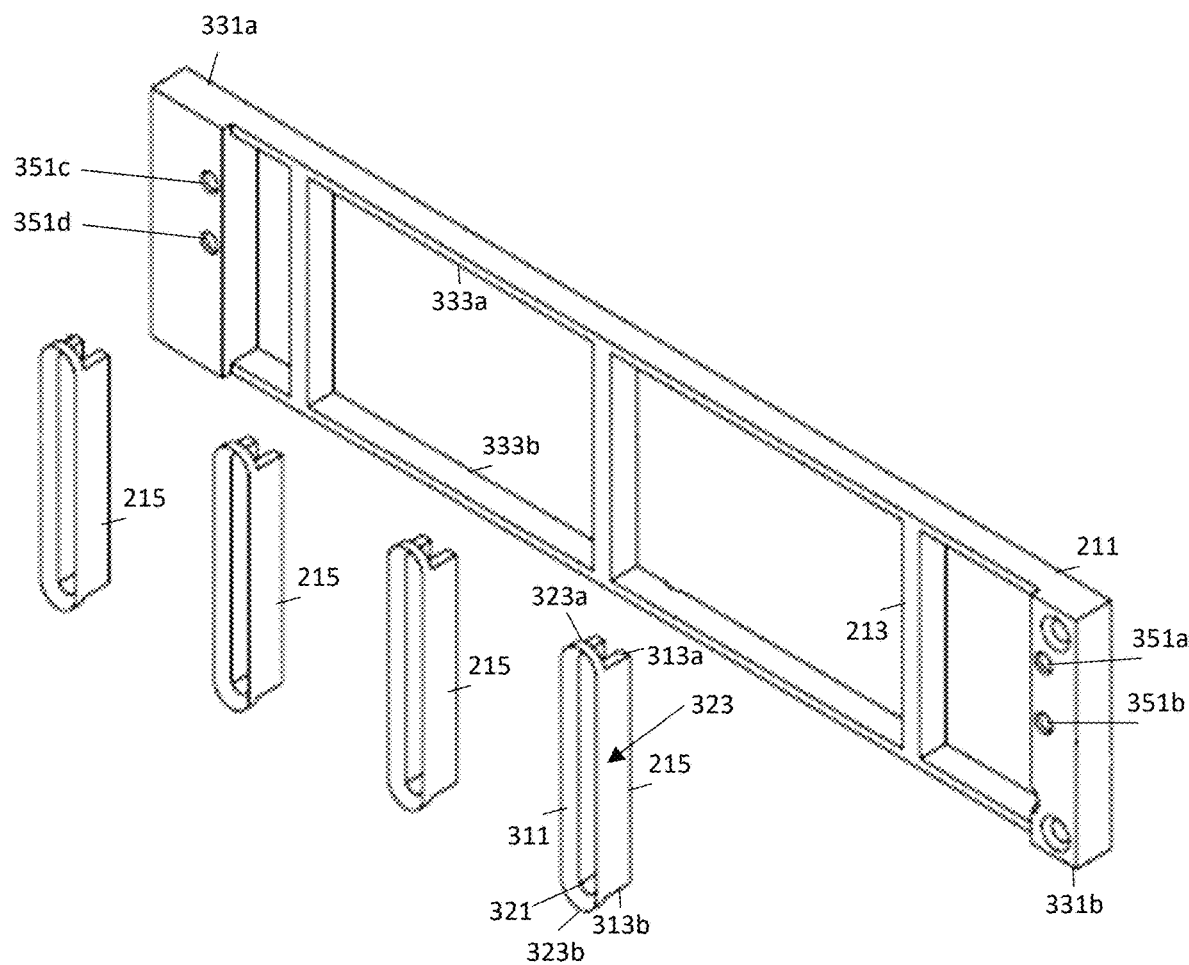
FIG. 3 illustrates an exploded view of the mounting plate with adjustable spacers of FIG. 2.

FIG. 3 provides an exploded view on the mounting plate and spacers of FIG. 2. As previously indicated, the mounting plate 211 forms a rectangular outline with parallel top and bottom beams 333a,b, respectively, the ends of which are coupled by parallel left and right posts 331a,b, respectively. The left side post includes attachments points 351c,d for attachment of a door closer mechanism, with the right side post similarly including attachment points 351a,b. The attachment points may be in the form of threaded holes, for example to receive a shaft of a threaded screw or a bolt.

An area bounded by the beams and posts provides one or more openings through the mounting plate. In FIG. 3, a plurality of reinforcing bars, for example reinforcing bar 213, couple the top beam and bottom beam, in the area between the left and right posts. The reinforcing bars segment the area into multiple openings, although in some embodiments no reinforcing bars may be used and only a single opening may be provided. In some embodiments, the reinforcing bars are positioned laterally within the frame at positions known or believed to not overlay expected possible mounting hole locations in a door. The expected possible mounting hole locations may, in some embodiments, be determined based on knowledge of mounting hole patterns for door closer mechanisms of various manufacturers.

FIG. 3 shows four spacers 215. The spacers fit into the openings of the frame, with upper and lower portions of the spacers fitting against sides of the upper beam and lower beam, respectively. The spacers include side walls 311 and 323, which define a through slot 321. Ends of the side walls are coupled by couplings 323a,b, about outer edges of the side walls. The couplings in FIG. 3 are semi-circular in outline, although in various embodiments other shapes, for example triangular, square, or rectangular may be used. The walls are dimensioned to allow passage of a shaft, of a predetermined diameter, through the slot. The shaft may be a shaft of a screw or bolt. The walls, however, are sufficiently close to prevent passage of a head of the screw or bolt. In the embodiment of FIG. 3, outer edges of the slot are chamfered. The chamfered outer edges of the slot allow, for example for a beveled edge of a head of a screw or bolt to lie against the chamfered outer edges, with a top of the head of the screw or bolt flush with outer edges of the walls 311 and 323 of the spacers.

Cutouts 313a,b are provided for the opposing ends of the spacers, on a rear side of the spacers. The cutouts are positioned to allow portions of the walls of the spacers to fit in the rectangular openings of the frame of the mounting plate, while the couplings of the spacers may be fit against the upper and lower beams. In some embodiments the cutouts have a depth less than or equal to a thickness of the upper and lower beams. With such depths and thicknesses, with the spacers inserted into the frame, and the frame mounted to a door, rearward ends of the walls of the spacers do not apply pressure to the door, or at least do not apply excessive pressure such that installation of the mounting plate is made excessively difficult.

In some embodiments, and as illustrated in FIG. 3, the mounting plate has a stepped outer profile. In FIG. 3, thicknesses of the top beam and bottom beam are less than thicknesses of the left and right posts. While rearward sides (to be mounted against the door) share a common profile, the side posts extend outwardly (away from the door) to a greater extent than the beams. In some embodiments thickness of the couplings of the spacers (or the amount of spacer material at positions of the cutouts) is less than or equal to a difference in thickness between the beams and posts. Such thickness differentials allow for the couplings to lie flush within an outline defined by the side posts, or at least not extend outward from such an outline.

Figure 4:
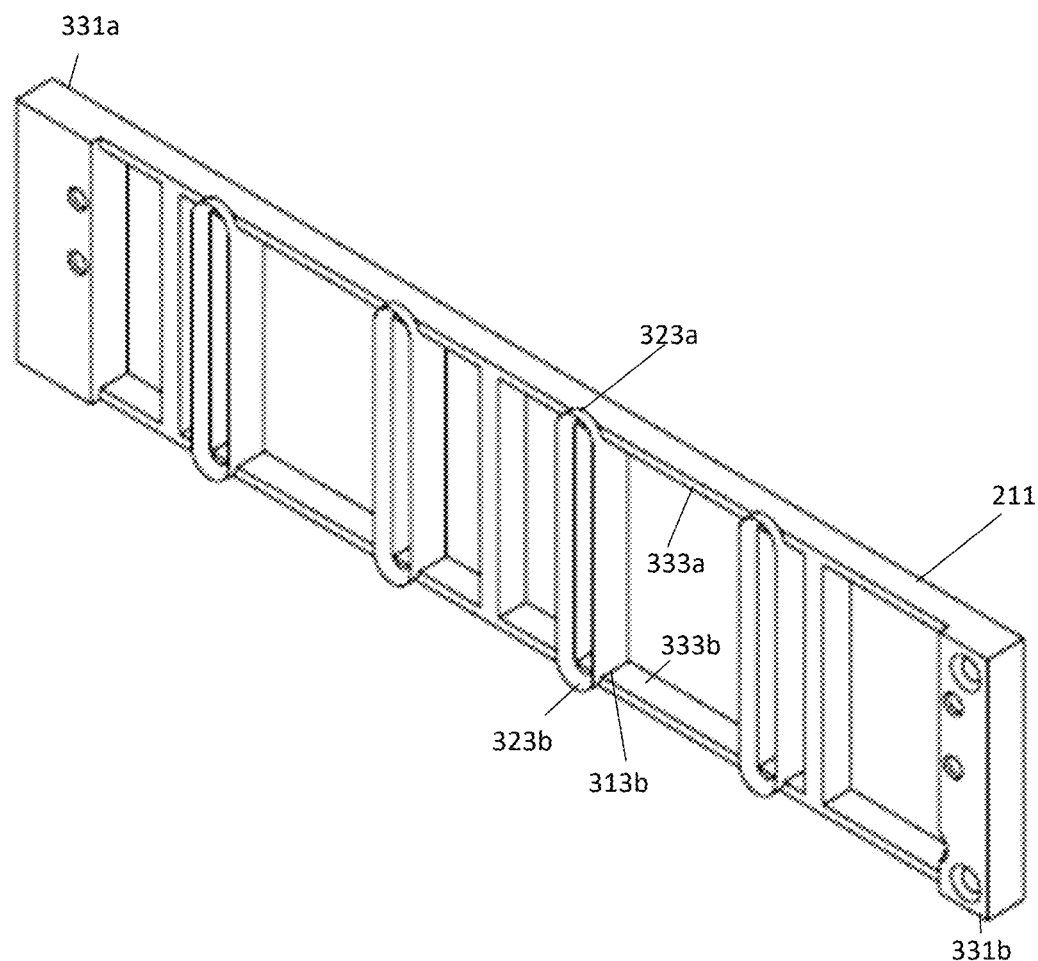
FIG. 4 illustrates a front isometric view of the mounting plate with adjustable spacers, with the spacers positioned in the mounting plate, in accordance with aspects of the invention.

FIG. 4 illustrates the mounting plate with the spacers positioned in the openings of the mounting plate. In FIG. 4, the spacers extend from the upper beam 333a to the lower beam 333b of the mounting plate 211, between the side posts 331a,b. The spacers are positioned such that their couplings 323a,b, at either end of the spacers, are fitted against outer sides of the beams 333a,b, respectively. The cutouts, e.g., cutout 313b, allow much of the walls of the spacers to fit within or between the top and bottom beams. Generally, the spacers are positioned such that the through slots of the spacers will overlay existing mounting holes in a door, or positions where mounting holes in a door are desired.

In FIG. 4, four spacers are shown. In various embodiments, however, fewer or greater numbers of spacers may be used, for example depending on a number of mounting holes available in a door or a desired number of screws or bolts to be used to mount the mounting plate to the door. The spacers are also shown with a generally common spacing between them, and between the left-most spacer and the left side post and between the right-most spacer and the right side post. The spacers, however, may be placed generally as desired in the openings along a length of the mounting plate, for example depending again on a number of mounting holes available in the door or a desired number of screws or bolts to be used to mount the mounting plate to the door.

Figure 5:
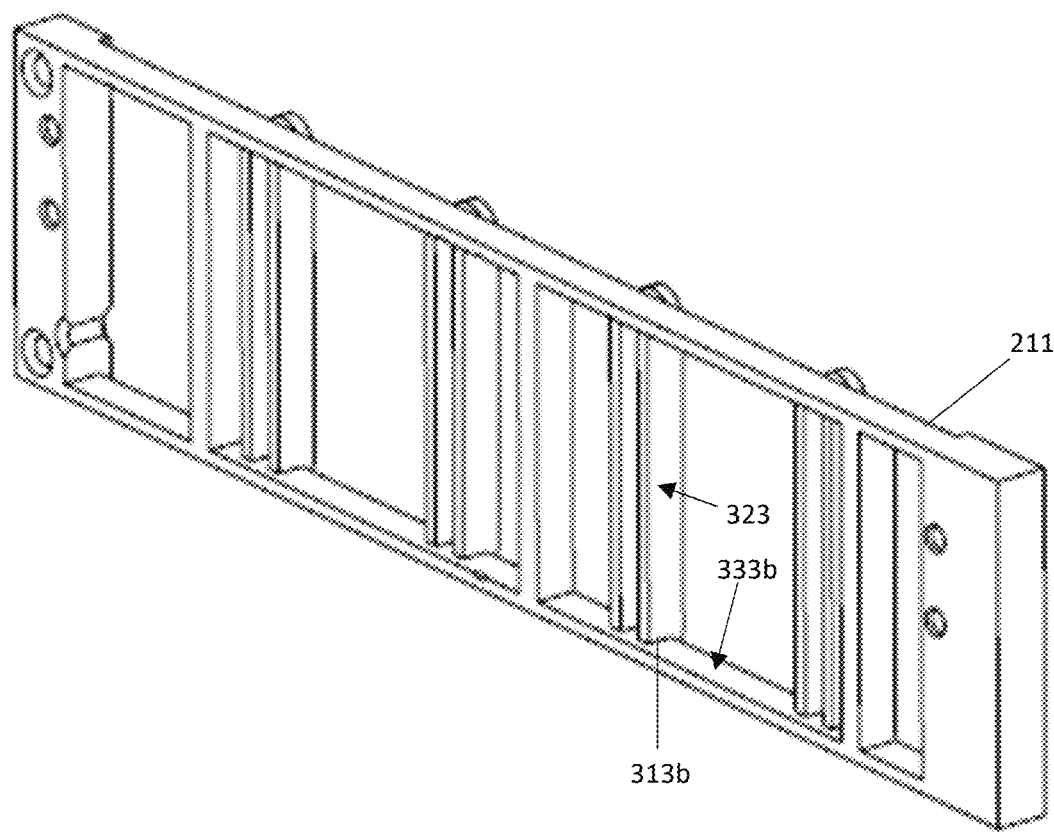
FIG. 5 illustrates a rear isometric view of the mounting plate of FIG. 4.

FIG. 5 illustrates a rear of the mounting plate, with spacers positioned in openings of the mounting plate. In FIG. 5, a lower cutout 313b of a spacer is shown as on a lower beam 333b of the mounting plate 211. The walls of the spacer are shown as extending into a rectangular opening in the mounting plate, with a rear of the through slot visible in FIG. 5. The walls of the spacer, e.g., wall 323, are also shown as extending into the opening to a depth less than a thickness of the lower beam. In the embodiment of FIG. 5, therefore, when the mounting plate and spacers are positioned against a door, the walls of the spacers will not press against the door, allowing the mounting plate to be flush with the door.

In some embodiments the mounting plate may not be rectangular, and the openings in the mounting plate for the spacers also may not be rectangular. In some embodiments the openings include portions having opposing parallel linear sides. The opposing parallel linear sides allow for placement of the spacers as discussed above, with respect to the rectangular openings in the plate (which also have portions having opposing parallel linear sides).

Figure 6:
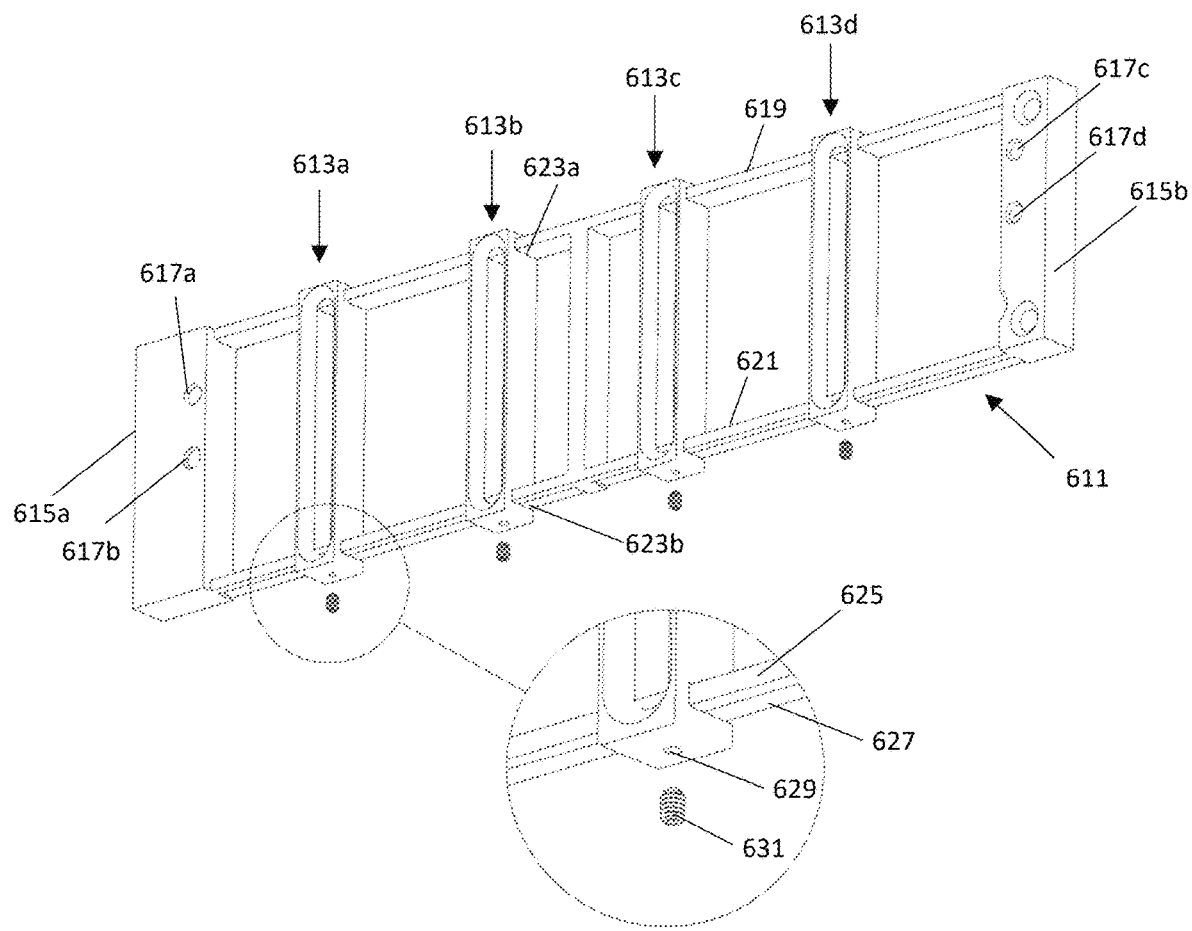
FIG. 6 illustrates a front isometric view of a further embodiment of a mounting plate with adjustable spacers, with the spacers positioned in the mounting plate, in accordance with aspects of the invention.

FIG. 6 illustrates a further embodiment of a mounting plate 611 with adjustable spacers 613a-d. In the embodiment illustrated in FIG. 6, four spacers are used. In various other embodiments, fewer or greater numbers of spacers may be used. As with the embodiment of, for example, FIG. 4, the mounting plate may be attached to a door using the spacers and screws or the like passed through slots of the spacers, with a door closer mechanism attached to the mounting plate.

As with the embodiment of for example FIG. 4, the mounting plate includes a top beam 619, a bottom beam 621 parallel to the top beam, and left and right side posts 615a,b connecting ends of the top and bottom beams. The side posts have a greater thickness—from front (away from the door) to rear (towards the door)—than the top and bottom beams. The side posts each include two attachment points, 615a-b, 615c-d, respectively, for attachment of the door closer mechanism.

The attachment points may be threaded holes.

The spacers include through slots, for example as discussed with respect to FIG. 3. The spacers also include cutouts forming slots, for example slots 623a,b, about opposing ends of the spacers. The slots are dimensioned to receive the top beam and the bottom beam, and are shown in FIG. 6 with those beams received by the slots, and the spacers spanning the distance between the top and bottom beams. In most embodiments the slots have a depth less than or equal to a thickness—from front (away from the door) to rear (towards the door)—of the top and bottom beams. Also, in most embodiments, remaining portions of spacer at locations of the cutout slot have a thickness less than or equal to the difference in thickness between the side posts and the top and bottom beams. This allows, for example, for the spacers to have a thickness less than or equal to a thickness of the side posts, and for the installed spacers to fit within a horizontal envelope defined by the side posts with the mounting plate flush against a door.

FIG. 6 includes a detail view of a lower end of the spacer 613a and surrounding portion of the lower beam 621. The cutout slot effectively makes the bottom of the spacer a flange. The flange includes a threaded hole 629 to receive a set screw 631. The set screw may be screwed into the hole to bias against the bottom beam, frictionally holding the spacer in place with respect to the bottom beam. In some embodiments a corresponding flange in a top of the spacer may instead or in addition include the threaded hole for a set screw, with a set screw holding the spacer in place with respect to the top beam.

The detail view of FIG. 6 also shows the bottom beam as including a horizontal bar 627 longitudinally terminating in a lip 625 on a side meant to be away from the door. In operation, the set screw of the spacer may frictionally contact the horizontal bar. In the event of partial loosening of the set screw, the lip may serve to retain the set screw in a position under the horizontal bar.

Although the invention has been discussed with respect to various embodiments, it should be recognized that the invention comprises the novel and non-obvious claims supported by this disclosure.

What is claimed is:

1. A mounting plate for a door closer, comprising:
    a plate including a plurality of attachment points and with at least one opening therethrough; and
    a plurality of spacers dimensioned to fit against portions of the plate about a set of opposing sides of the at least one opening, the spacers each having a through slot;
    wherein the plate includes a stepped profile, with different portions of the plate having different thicknesses; and
    wherein portions of the plate including the attachment points have a greater thickness than portions of the plate about the set of opposing sides of the at least one opening.

2. The mounting plate of claim 1, wherein the spacers include cutouts about opposing ends of the spacers.

3. The mounting plate of claim 2, wherein the cutouts are at opposing ends of the spacers, to fit within the opposing sides of the at least one opening.

4. The mounting plate of claim 2, wherein the through slot extends at least between the cutouts at the opposing ends of the spacers.

5. The mounting plate of claim 3, wherein the cutouts fit against the opposing sides of the at least one opening.

6. The mounting plate of claim 2, wherein the cutouts each form a slot in the spacers, each slot dimensioned to receive a one of the opposing sides of the plate.

7. The mounting plate of claim 6, wherein each slot is bounded on an outer side by a flange formed in the spacers by the cutouts.

8. The mounting plate of claim 7, wherein one flange of each spacer includes a threaded hole for receiving a set screw.

9. The mounting plate of claim 2, wherein a depth of the cutouts is less than a thickness of the plate about the opposing sides of the at least one opening.

10. The mounting plate of claim 1, wherein the through slot has chamfered opposing edges.

11. A mounting plate for a door closer, comprising:
a plate including a plurality of attachment points and with at least one opening therethrough; and
a plurality of spacers dimensioned to fit against portions of the plate about a set of opposing sides of the at least one opening, the spacers each having a through slot;
wherein opposing ends of the spacers include cutouts to fit within the opposing sides of the at least one opening, wherein portions of the plate including the attachment points have a greater thickness than portions of the plate about the set of opposing sides of the at least one rectangular opening, and wherein a thickness of the opposing ends of the spacers is less than or equal to a difference in thickness between the portions of the plate including the attachment points and the portions of the place-plate about the set of opposing sides of the at least one opening.

12. The mounting plate of claim 1, wherein the attachment points comprise threaded holes.

13. The mounting plate of claim 1, wherein the at least one opening comprises a plurality of openings.

14. The mounting plate of claim 1, wherein the at least one opening comprises a rectangular opening.

15. A mounting plate for a door closer, comprising:
a frame including a plurality of attachment points, the frame defining at least one opening, each at least one opening having at least one section having linear parallel opposing sides; and
a plurality of components having opposing walls defining a through slot, at least part of the opposing walls coupled by a coupling at each end, the plurality of components dimensioned such that a portion of the coupling at each end fit against portions of the frame about the at least one opening;
wherein the frame has a first thickness about the plurality of attachment points and a second thickness about the linear parallel opposing sides of the at least one opening, with the first thickness greater than the second thickness.

16. The mounting plate of claim 15, wherein the portion of the coupling that fits against portions of the frame comprises a portion that fits against a face of the portions of the frame about the at least one opening, with the portion of the coupling that fits against the face of the portions of the frame having a thickness less than or equal to a difference between the first thickness and the second thickness, such that the portion of the coupling does not extend beyond a plane defined by the plurality of attachment points with the portion of the coupling fitted against the face of the portions of the frame about the at least one opening.

17. A mounting plate for a door closer, comprising:
a rectangular frame having a front side, a rear side, an upper beam, a lower beam, and a first post and a second post coupling opposing ends of the upper beam and lower beam, the upper beam parallel to the lower beam and the first post parallel to the second post, the first post and the second post having a greater thickness than the upper beam and the lower beam, the first post and the second post each having threaded holes and a mount surface; and
a plurality of spacers dimensioned to fit against the upper beam and the lower beam, the plurality of spacers each including a through slot, the through slot having a depth less than or equal to the depth of the first post and the second post, each of the plurality of spacers having a front surface and a back surface;
wherein the plurality of spacers, the upper beam, and the lower beam are sized and configured so that when the plurality of spacers are fit against the upper beam and the lower beam, the front surfaces of the plurality of spacers are not forwardly relative to the first and second post mount surfaces.

18. The mounting plate of claim 17, wherein the upper beam has an upper beam front mount surface and the lower beam has a lower beam front mount surface, the plurality of spacers configured to fit against the upper beam front mount surface and lower beam front mount surface, and wherein the upper beam front mount surface and lower beam front mount surface are both disposed rearwardly relative to the first and second post mount surfaces.

19. The mounting plate of claim 18, wherein the plurality of spacers, the upper beam, and the lower beam are sized and configured so that when the plurality of spacers are fit against the upper beam and the lower beam, the back surfaces of the plurality of spacers are forwardly relative to a rear surface of the rectangular frame.

20. The mounting plate of claim 1, wherein a plate mount surface is defined adjacent the plurality of attachment points and each of the plurality of spacers has a spacer front surface, and wherein the spacers are sized and configured so that when the plurality of spacers are fit against portions of the plate the spacer front surfaces are not forwardly of the plate mount surface.

21. The mounting plate of claim 15, wherein a frame mount surface is defined about the plurality of attachment points and each of the plurality of components has a component front surface, and wherein each of the plurality of components is sized and configured so that when the component is fit against portions of the frame the component front surface is not forwardly of the frame mount surface.

* * * * *